Nov. 8, 1966  K. E. BUCKMAN ET AL  3,283,904
FILTER ELEMENT HAVING DUAL POROSITIES
Filed Sept. 9, 1963                                      3 Sheets-Sheet 1
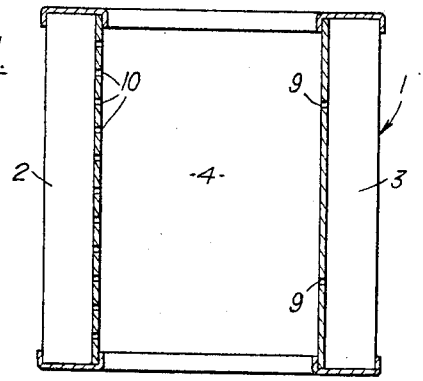
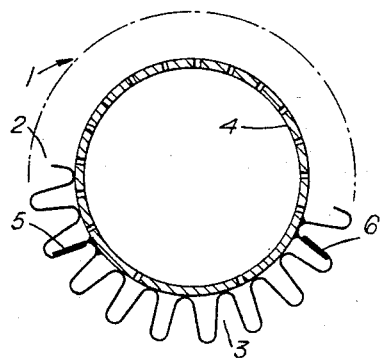
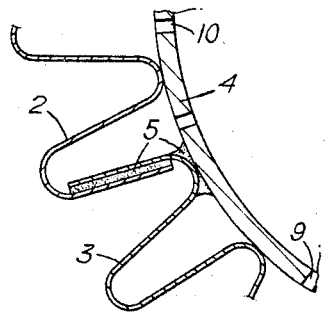
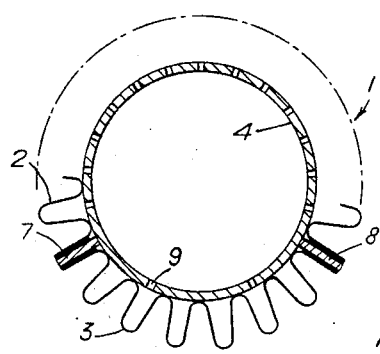
INVENTORS
Kenneth Ernest Buckman,
Stanley William Kemp,
Derrick Percival Tuffnell,
Ronald Arthur Cross
BY George E. Johnson
Attorney Nov. 8, 1966   K. E. BUCKMAN ET AL   3,283,904
FILTER ELEMENT HAVING DUAL POROSITIES
Filed Sept. 9, 1963   3 Sheets-Sheet 2
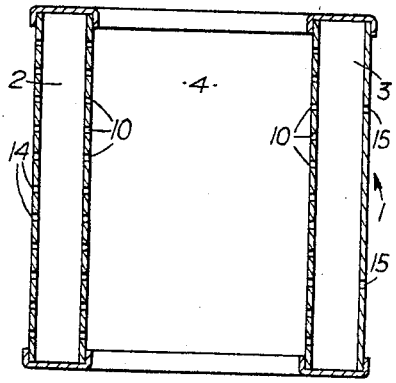
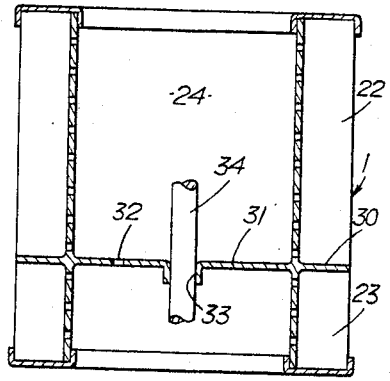
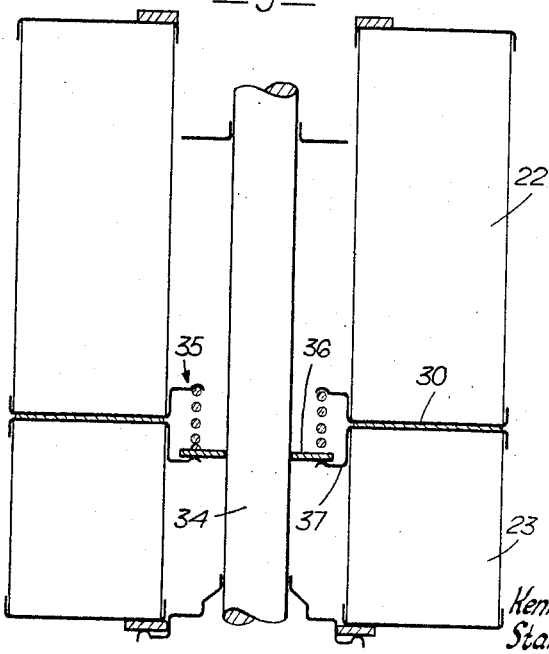
INVENTORS
Kenneth Ernest Buckman,
Stanley William Kemp,
Derrick Percival Tuffnell
Ronald Arthur Cross
BY George E. Johnson
Attorney

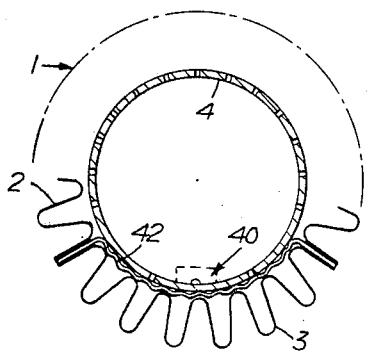
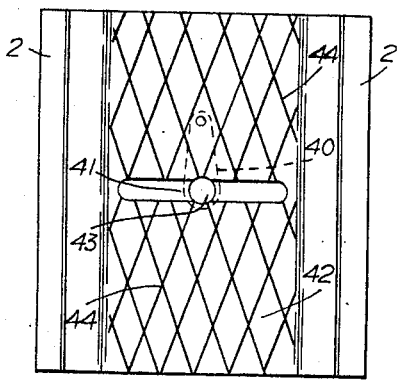
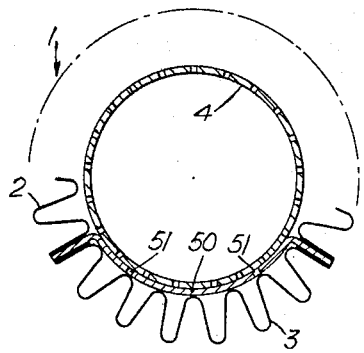
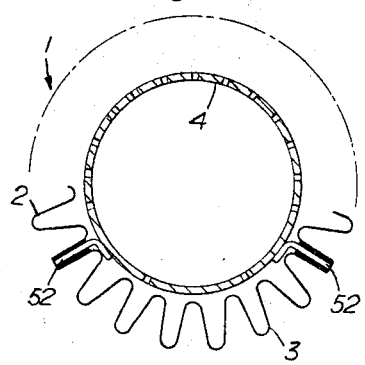
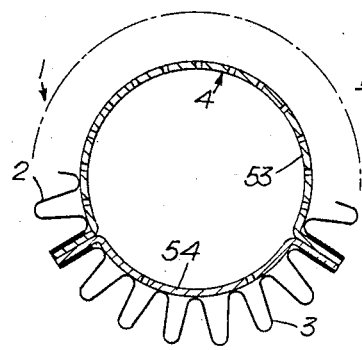

United States Patent Office 3,283,904
Patented Nov. 8, 1966

3,283,904
FILTER ELEMENT HAVING DUAL POROSITIES
Kenneth Ernest Buckman, Winsor, near Woodlands Southampton, Stanley William Kemp, Totton, Derrick Percival Tuffnell, North Baddesley, and Ronald Arthur Cross, Maybush, Southampton, England, assignors to General Motors Corporation, Detroit, Mich, a corporation of Delaware
Filed Sept. 9, 1963, Ser. No. 307,557
Claims priority, application Great Britain, Sept. 11, 1962, 34,612/62; Jan. 16, 1963, 1,900/63
3 Claims. (Cl. 210—132)

This invention relates to filters for liquids and in particular to oil filters for internal combustion engines.

According to the present invention a filter for liquids includes filter elements of different porosity and a control device for effecting, during the operation of the filter, a variation in the relative proportions of the liquid to be filtered which pass through the respective filter elements.

Preferably the control device is such as to ensure that, during an initial period of operation of the filter the proportion of the liquid which passes through the element of finer porosity is greater than that which passes through the element of less fine porosity.

The control device is arranged so that during the initial period of operation of the filter the flow of liquid through the element of less fine porosity is restricted as compared with that through the element of finer porosity; the restriction may be such as completely to block the flow of liquid through the element of less fine porosity during the intial period of operation, or it may permit a limited flow of liquid through such element. Thus the control device may be a valve or it may be in the form of a member having perforations therein the size and number of which is such as to provide a predetermined restriction to the flow of liquid passing to the less fine porosity element.

By means of the invention a filter for liquids, for example an oil filter for an internal combustion engine can be arranged to operate so that, during the initial period of operation of the filter a major proportion of the liqiud to be filtered will pass through the element of finer porosity, thereby ensuring that during such initial period of operation a relatively high proportion of finer particles of foreign material present in the liquid will be removed and will gradually form a filter bed on said element, and that during a succeeding period of operation an increased proportion of the liquid delivered to the filter unit will be passed through the element of less fine porosity. By appropriate adjustment of the restriction to flow through the element of less fine porosity which is provides by the control device it is possible to ensure that, despite the formation of a filter bed on the element of finer porosity, a proportion of the liquid delivered to the fiiter will still continue to flow through such element until a point is reached when the useful life of the filter elements is ended, this preferably taking place when the pressure drop across the element of less fine porosity is substantially the same as that at which the filter relief valve, such as is commonly provided, is set to operate.

The two filter elements may form parts of single filter unit; or two separate elements may be arranged in a filter housing for parallel flow through both elements.

The filter unit including the two filter elements may conveniently be formed as an annular member having a division either longitudinally or transversely of its axis between the two elements of different porosity.

The scope of the invention is defined by the appended claims; and the invention and the method by which is to be performed are hereinafter particularly described with reference to the accompanying drawings in which:

FIGURE 1 is a vertical section through one embodiment of a filter unit according to the invention;

FIGURE 2 is a horizontal section through the filter unit shown in FIGURE 1;

FIGURE 3 is a detail to a larger scale of part of the filter unit shown in FIGURE 2;

FIGURE 4 is a horizontal section of a second embodiment of the invention;

FIGURE 5 is a vertical section through a third embodiment of the invention;

FIGURE 6 is a vertical section through a fourth embodiment of the invention;

FIGURE 7 is a vertical section through a fifth embodiment of the invention;

FIGURES 8 and 9 are respectively horizontal and vertical sections through a sixth embodiment of the invention; and FIGURES 10 to 12 are horizontal sections through filter units according to the invention, showing three different means for forming radial fins for the attachment of the filter elements.

In one embodiment of the invention (FIGURES 1 to 3) an annular filter unit 1 is made of a strip of sheet filter material, such as synthetic-resin impregnated filter paper, folded about transverse fold lines to form a circular series of pleats in which the fold lines extend longitudinally of the annulus. The sheet filter material is in two portions 2, 3 which are of different porosity and the pleated sheet filter material is mounted on a perforate support tube 4 in such a way that the flow of liquid through the material 2 of finer porosity is separated from that through the filter material 3 of less fine porosity. The junctions between the two portions of the filter material be sealed by adhesive to each other and to the central perforate support tube 4 on which the elements are mounted as shown at 5 and 6 so that when in use in a filter the liquid delivered to the filter unit 1 is compelled to flow through two parallel paths through the two filter elements 2, 3 and cannot flow first through one element and then through the other before passing through the perforate support tube 4.

In an alternative form of construction shown in FIGURE 4 a pair of radial fins 7, 8 may be secured to the outer surface of the perforate support tube 4 and the respective ends of the material constituting the filter elements 1, 2 may be sealed, as by adhesive, to the fins 7, 8.

The perforations in the support tube 4 are of such size and arrangement over the portions of the tube 4 adjacent the respective elements 2, 3 that the restriction to flow from the outside to the inside of the filter unit 1 is greater in the case of the element 3 of less fine porosity than in the case of the element 2 of finer porosity. As shown in FIGURES 1 to 3 the portion of the support tube 4 adjacent the element 3 has therein only a small number of perforations 9 whereas the portion of the centre tube adjacent the filter element 2 has therein a relatively large number of perforations 10. The restriction to flow through the respective filter elements is preferably such that when the filter unit is first brought into use approximately ⅔ of the total quantity of liquid to be filtered passes through the finer porosity element 2 and approximately ⅓ of the liquid through the less fine porosity element 3. In the case of a filter in which the customary filter element relief valve is set to open at a pressure of 15 lbs. per sq. in. the size and number of the restriction holes 10, 9 in the support tube 4 adjacent the two elements 2, 3 is such that a pressure drop of approximately one quarter of the aforesaid pressure rating is obtained across the holes 9 in the support tube 4 adjacent the less fine porosity element 3.

In the operation of the filter unit 1 when installed in a filter casing approximately two thirds of the total quantity of liquid passes through the fine porosity element 2 during the initial period of operation. As a bed of deposited foreign matter filtered out from the liquid builds up on the finer porosity element 2 the restriction to flow therethrough increases and a correspondingly increasing proportion of the total flow of liquid is thereby caused to flow through the less fine porosity element 3. The effect of this, for example in the filtration of oil in an internal combustion engine, is that initially there will be a high degree of fine filtration, because a major proportion of the liquid is passed through the finer porosity element 2 and a correspondingly high proportion of the total quantity of foreign particles in the oil is removed. During a subsequent period of operation the major portion of the oil passes through the element of less fine porosity 3 where filtration is effected but not to such a fine degree. During this latter period of operation, however, a proportion of the oil is still subjected to filtration through the finer porosity element 2. It is found that the degree of filtration achieved in this way is finer than could be permitted in the case in which filtration is effected with only a single filter element and that the overall accumulative efficiency of the two filter elements 2, 3 of different porosity is at this stage greater than in the case in which a single element is used. A point will eventually be reached at which the resistance to flow through the two filter elements 2, 3, by the accumulation of foreign material thereon, will be such as to cause operation of the filter relief valve so as to by-pass the filter unit 1; and by appropriate selection of the degrees of porosity of the filter material constituting the two filter elements 2, 3 such actuation of the relief valve will take place when both of the elements have completed their useful life.

In an alternative to the construction described above the control device by which the initial proportions of the total quantity of liquid which will pass through the filter elements 2, 3 is determined may be in the form of a perforate tube 12 (FIGURE 5) which is arranged externally of the filter elements 2, 3, the central support tube 4 in this case having uniformly distributed perforations 10. The external perforate tube 12 will have a relatively large number of perforations 14 over the portion thereof adjacent the finer porosity element 2 and a relatively small number of perforations 15 over the portion thereof adjacent the less fine porosity element 3. The filter elements 2, 3 will be sealed, as by adhesive, to the two portions of the external perforate tube 12 so that liquid passing through one filter element cannot pass through the other before passing through the central perforate tube 4.

In another alternative form of construction shown in FIGURE 6 the filter unit 1 is formed of two annular filter elements 22, 23 respectively of fine porosity and less fine porosity filter material, the elements 22, 23 being mounted on a central perforate support tube 24 and being secured together and sealed from each other end-to-end, for example by sealing the elements to opposite sides of an annular partition 30. In this case the control device by which, during an initial period of operation a greater proportion of the total quantity of liquid is caused to flow through the finer porosity element 22 may be provided by different groups of perforations in the central support tube 24 adjacent the respective elements 22, 23, or by different groups of perforations in an external perforate tube (not shown). As a further alternative to these forms of the control device the central passage within the filter unit may, as shown, have therein a transverse partition 31 in line with the junction between the elements 22, 23 the partition 31 having therein one or more control openings 32 so as to provide a resistance to flow through the less fine porosity element 23 which will ensure the desired initial flow through the finer porosity element 22. Such partition 31 may also have therein a central opening 33 adapted to provide a sliding seal fit on a centre bolt 34 by which the filter unit is secured in a filter housing.

In a still further alternative construction shown in FIGURE 7, the control device comprises a relief valve 35 arranged within the space within the central support tube 4 so as to divide the latter into two portions respectively in communication with the two filter elements 22, 23, the relief valve 35 being adapted to operate at a predetermined pressure such that during an initial period of operation of the filter the valve is closed and the liquid to be filtered flows only through the finer porosity element but when a predetermined pressure drop across the finer porosity element 22 occurs after the deposition thereon of a filter bed of filtered foreign particles the valve 35 will operate to permit flow through the less fine porosity element 23 in addition to that through the finer porosity element 22. The valve may comprise a spring-loaded annular plate 36, which is slidably mounted on the centre bolt 34, and a valve cage 37 which fits in the central passage through the filter unit and forms a seal between the two filter elements 22, 23. Alternatively the valve may be a rubber flap valve (not shown) arranged in a partition which extends about the centre bolt 34 and forms a seal between the two elements.

In another form of construction in which two filter elements 2, 3 are made from two lengths of sheet filter material of different porosity so as to form a pleated filter unit 1 of annual form in which one sector of the unit is of less fine porosity than the other, the control device may be in the form of a T-shaped valve 40 comprising a spring leaf 41 which closes off the flow of liquid through the filter element 3 which is of less fine porosity. The perforations in that part of the central support tube 4 for the filter unit which is adjacent the filter element 3 are closed by a metal plate 42 having therein an opening 43 which, in turn, is closed by the spring leaf 41 so as to form a relief valve adapted to open when there is a predetermined pressure drop across the element of finer porosity, the relief valve 40 when open permitting flow through the element 3 of less fine porosity. The plate 42 which closes off the portion of the centre tube 4 adjacent the element 3 has grooves 44 impressed therein on its opposite side to provide communication to and from the valve 40 of the oil which has passed through the element 3 of less fine porosity. FIGURE 8 shows plate 42 to have opposite margins flanged to "ride" with the element 3.

As an alternative to the arrangement shown in FIGURE 4 in which the central support tube 4 has radial fins 7, 8 to which the ends of the filter elements 2, 3 are secured, the fins may be part of a part-cylindrical member 50 which is secured to a part of the central support tube 4 as shown in FIGURE 10, the part 50 having therein openings 51 the number and size of which is such as to provide the desired initial flow through the filter element 2. Alternatively, as shown in FIGURE 11 the fins may be strips 52 of L-section which are attached to the central support tube 4 or, as shown in FIGURE 12 the central support tube 4 may be formed of two parts 53, 54 having different numbers and sizes of perforations therein which are secured together by radial extending portions thereof which constitute the fins to which the ends of the filter elements 2, 3 are secured by adhesive.

We claim:

1. A filter for liquid comprising a tubular support having openings therein, two fixed portions of filter material, one of said portions having a fine porosity and the other a less fine porosity, said portions being in contact with and covering an exterior surface of said tubular support, a part of the said exterior support surface corresponding with said fine porosity portion having a number of said openings per square inch of area greater than a number of said openings per square inch of area in part of the said exterior support surface corresponding with said less fine porosity portion.

2. A filter for liquid comprising a tubular support for conducting liquid, a single annular cylindrical filter element divided longitudinally into two full length portions of filter material retained by said tubular support, said portions having different porosities, openings in said tubular support facing said filter material, those of said openings corresponding with the portion of filter material having the finer porosity being characterized by having a greater flow rate per square inch of surface area than the flow rate per square inch of surface area of those of said openings corresponding with the other of said two portions.

3. A filter as set forth in claim 2, spring loaded valve means being interposed in a fluid flow path leading through said tubular support and said filter material, and the arrangement of said valve means being such as to effect opening of the latter when a predetermined pressure drop through the said finer porosity portion of the filter material occurs to divert flow from said finer porosity portion and through the said other portion of filter material.

References Cited by the Examiner

UNITED STATES PATENTS

| | | | |
|---|---|---|---|
| 2,253,686 | 8/1941 | Burckhalter | 210—133 X |
| 2,271,054 | 1/1942 | Williams | 210—342 |
| 2,559,267 | 7/1951 | Winslow et al. | 210—484 X |
| 2,605,904 | 8/1952 | Ogilvie | 210—132 |
| 2,749,265 | 6/1956 | Fricke et al. | 210—493 X |
| 2,773,601 | 12/1956 | Keller et al. | 210—266 |
| 2,833,415 | 5/1958 | Wilkinson | 210—440 X |
| 2,850,168 | 9/1958 | Nostrand | 210—130 X |
| 2,998,138 | 8/1961 | Mould et al. | 210—315 X |
| 3,127,341 | 3/1964 | Abeles | 210—493 |
| 3,224,583 | 12/1965 | Rosaen | 210—315 X |

REUBEN FRIEDMAN, *Primary Examiner.*

F. SPEAR, *Assistant Examiner.*